(12) United States Patent
Guilani

(10) Patent No.: US 11,802,022 B2
(45) Date of Patent: Oct. 31, 2023

(54) SELF HEALING ELEVATOR LOAD BEARING MEMBER

(71) Applicant: OTIS ELEVATOR COMPANY, Farmington, CT (US)

(72) Inventor: Brad Guilani, Woodstock Valley, CT (US)

(73) Assignee: Otis Elevator Company, Farmington, CT (US)

( * ) Notice: Subject to any disclaimer, the term of this patent is extended or adjusted under 35 U.S.C. 154(b) by 600 days.

(21) Appl. No.: 16/677,186

(22) Filed: Nov. 7, 2019

(65) Prior Publication Data

US 2021/0139279 A1    May 13, 2021

(51) Int. Cl.
| | |
|---|---|
| *B66B 7/06* | (2006.01) |
| *B29C 73/20* | (2006.01) |
| *B29D 29/00* | (2006.01) |
| *B66B 5/02* | (2006.01) |
| *D07B 5/00* | (2006.01) |
| *D07B 1/22* | (2006.01) |

(52) U.S. Cl.
CPC .............. *B66B 7/062* (2013.01); *B29C 73/20* (2013.01); *B29D 29/00* (2013.01); *B66B 5/02* (2013.01); *D07B 1/22* (2013.01); *D07B 5/006* (2015.07); *D07B 2201/2083* (2013.01); *D07B 2501/2007* (2013.01)

(58) Field of Classification Search
CPC ........... B66B 7/062; B66B 5/02; D07B 5/006; D07B 1/22; D07B 2201/2083; D07B 2501/2007; B29C 73/20; B29D 29/00
See application file for complete search history.

(56) References Cited

U.S. PATENT DOCUMENTS

| | | | | |
|---|---|---|---|---|
| 5,263,307 A | * | 11/1993 | Hasui ..................... | D07B 7/185 57/7 |
| 5,561,173 A | * | 10/1996 | Dry ..................... | C04B 40/0675 428/321.1 |
| 6,527,849 B2 | * | 3/2003 | Dry ......................... | B32B 15/18 106/676 |
| 7,022,179 B1 | * | 4/2006 | Dry ......................... | A61L 27/48 428/321.1 |
| 7,612,152 B2 | * | 11/2009 | Braun ..................... | B29C 73/22 525/476 |
| 7,828,121 B2 | * | 11/2010 | Parrini ................... | D07B 1/025 428/374 |
| 8,383,697 B2 | * | 2/2013 | Wilson ................ | A61L 24/0094 523/120 |
| 9,415,575 B2 | * | 8/2016 | Beiermann ........... | B32B 27/283 |
| 9,816,189 B2 | * | 11/2017 | Fitz ........................ | C09D 5/086 |
| 10,053,331 B2 | * | 8/2018 | Kere ....................... | D07B 1/148 |
| 10,682,823 B2 | * | 6/2020 | Hammer ................ | C08K 3/013 |
| 2001/0050032 A1 | * | 12/2001 | Dry ......................... | C22C 49/00 106/676 |

(Continued)

FOREIGN PATENT DOCUMENTS

WO    WO-2011076273 A1 * 6/2011 ........... D07B 1/0693

*Primary Examiner* — Michael A Riegelman

(74) *Attorney, Agent, or Firm* — Carlson, Gaskey & Olds, P.C.

(57) ABSTRACT

An elevator load bearing member includes a plurality of load bearing cords and a jacket at least partially surrounding the cords. The jacket includes a layer received against the cords, and a self-healing component. A method of making an elevator load bearing member is also disclosed.

19 Claims, 2 Drawing Sheets

(56) References Cited

U.S. PATENT DOCUMENTS

| | | | | |
|---|---|---|---|---|
| 2006/0252852 | A1* | 11/2006 | Braun | B29C 73/22 |
| | | | | 524/80 |
| 2007/0282059 | A1* | 12/2007 | Keller | C08L 83/04 |
| | | | | 524/588 |
| 2008/0003430 | A1* | 1/2008 | Wilson | D01F 6/60 |
| | | | | 428/375 |
| 2014/0302316 | A1* | 10/2014 | Gallens | B66B 7/06 |
| | | | | 427/180 |
| 2015/0191332 | A1* | 7/2015 | Kere | B66B 7/1223 |
| | | | | 428/297.4 |
| 2018/0305179 | A1* | 10/2018 | Guilani | F16G 5/06 |
| 2018/0305180 | A1* | 10/2018 | Guilani | B66B 7/062 |
| 2018/0305549 | A1* | 10/2018 | Papas | C08L 83/04 |
| 2019/0071281 | A1* | 3/2019 | Zhao | B66B 7/062 |
| 2019/0084803 | A1* | 3/2019 | Eastman | D07B 1/162 |
| 2019/0168999 | A1* | 6/2019 | Guilani | B66B 7/062 |
| 2019/0218061 | A1* | 7/2019 | Eastman | D07B 1/16 |
| 2021/0139279 | A1* | 5/2021 | Guilani | B29C 73/20 |

\* cited by examiner

SELF HEALING ELEVATOR LOAD BEARING MEMBER

BACKGROUND

A variety of elevator systems are known. Some elevator systems use a hydraulic arrangement for moving the elevator car. Others are traction-based and include roping that suspends the elevator car and a counterweight. A machine causes movement of a traction sheave that, in turn, causes movement of the roping for moving the elevator car as desired.

For many years, roping in elevator systems included round steel ropes. More recently, flat belt technologies were developed that provided advantages over traditional, round steel rope arrangements. Even with the advancement, those skilled in the art have been striving to improve elevator load bearing member technology.

SUMMARY

An elevator load bearing member according to an example of this disclosure includes a plurality of load bearing cords and a jacket at least partially surrounding the cords. The jacket includes a layer received against the cords, and a self-healing component.

In a further example of the foregoing, an outer coating surrounds the jacket. The outer coating includes the self-healing component.

In a further example of any of the foregoing, the layer includes the self-healing component.

In a further example of any of the foregoing, the outer coating is selectively applied to portions of the layer.

In a further example of any of the foregoing, the self-healing component includes an intrinsically self-healing material.

In a further example of any of the foregoing, the outer coating includes less than about 50 percent by weight of the self-healing component.

In a further example of any of the foregoing, the layer includes the self-healing component.

In a further example of any of the foregoing, the self-healing component includes microcapsules. The microcapsules include a breakable shell with a resin encapsulated in the shell of polymer resins.

In a further example of any of the foregoing, the microcapsules rupture at pressures greater than about 10 megapascals (MPa).

In a further example of any of the foregoing, the layer includes less than about 50 percent by weight of the self-healing component.

In a further example of any of the foregoing, an outer coating surrounds the jacket. The outer coating includes the self-healing component.

In a further example of any of the foregoing, the self-healing component in the outer coating includes at least one of an intrinsically self-healing material and a shape memory polymer.

In a further example of any of the foregoing, the self-healing component includes at least one of microcapsules. The microcapsules include a breakable shell with a resin encapsulated in the shell of polymer resins, and an intrinsically self-healing material, and shape memory polymer.

A method of making an elevator load bearing member according to an example of this disclosure includes forming a jacket on a plurality of load bearing members. The jacket includes a self-healing component.

In a further example of the foregoing, the self-healing component includes microcapsules. The microcapsules include a breakable shell with a resin encapsulated in the shell of polymer resins.

In a further example of any of the foregoing, the self-healing component includes an intrinsically self-healing material.

In a further example of any of the foregoing, forming includes forming a layer on the plurality of load bearing cords, and forming an outer coating on the layer.

In a further example of any of the foregoing, forming the outer coating on the layer includes selectively applying the outer coating to portions of the layer.

In a further example of any of the foregoing, the self-healing component includes at least one of microcapsules. The microcapsules include a breakable shell with a resin encapsulated in the shell of polymer resins, and an intrinsically self-healing material.

In a further example of any of the foregoing, the jacket includes less than about 50 percent by weight of the self-healing component.

An example method of any of the previous paragraphs includes separately forming the inner portion and at least one layer of fluoropolymer material and laminating the at least one layer and the formed inner portion The various features and advantages of at least one disclosed example embodiment will become apparent to those skilled in the art from the following detailed description. The drawings that accompany the detailed description can be briefly described as follows.

DETAILED DESCRIPTION

Figure 1:
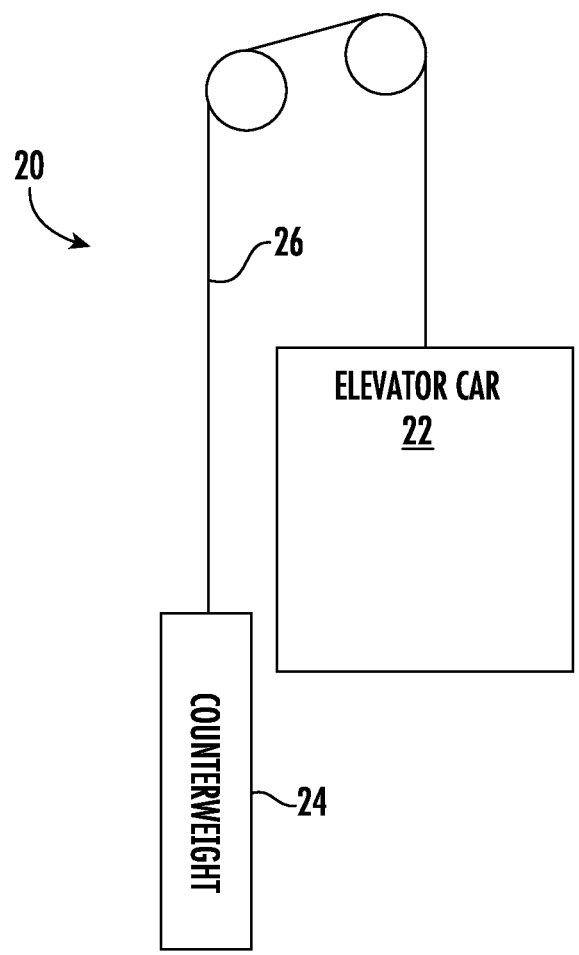
FIG. 1 schematically illustrates selected portions of an elevator system including a load bearing member designed according to an embodiment of this invention.

FIG. 1 schematically shows selected portions of an elevator system 20. An elevator car 22 and counterweight 24 are suspended by a load bearing member 26. A traction sheave associated with a machine (not specifically illustrated) selectively controls movement of the load bearing member 26 to control the movement or position of the elevator car 22. For illustration purposes, a single load bearing member 26 is represented in FIG. 1. Multiple load bearing members would be included in many embodiments.

Figure 2:
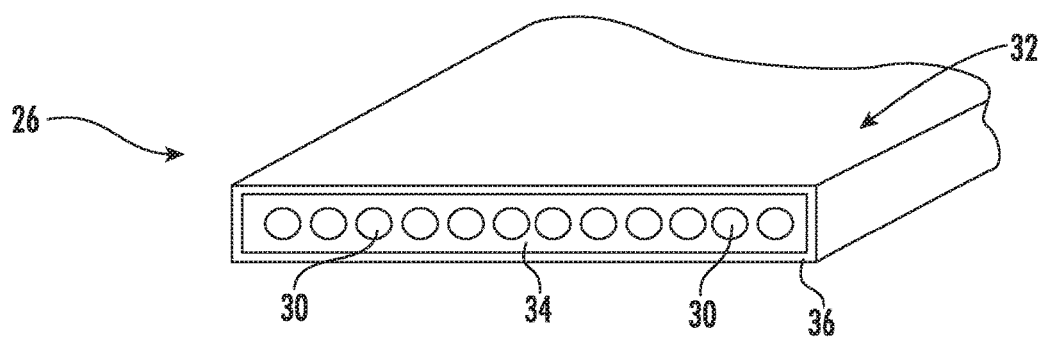
FIG. 2 schematically illustrates an example embodiment of an elevator load bearing member.

FIG. 2 schematically illustrates an example load bearing member 26 including a plurality of load bearing cords 30 that are at least partially surrounded by a jacket 32. The cords 30 may comprise a variety of materials that are useful for supporting the loads of the elevator system 20. In some embodiments, the cords 30 comprise steel and each include a plurality of wires. Other embodiments include cords 30 made of aluminum, carbon fiber, or liquid crystal polymer, for example.

The jacket 32 includes a polymeric portion or layer 34 that is received against the cords 30. The layer 34 comprises a compressible material that provides good adhesion with the cords 30 to provide adequate pullout strength to maintain the desired configuration of the load bearing member 26 over its useful life. Example embodiments include layer 34 that comprise at least one of polyurethane, polyamide, polyester, or ethylene propylene diene monomer rubber (EPDM).

The jacket 32 has self-healing properties, meaning the jacket 32 includes components that can repair damage, such as cracks, and/or mitigate the propagation of such damage. The damage/cracks can be caused by foreign objects or stresses. The self-healing components facilitate the repair either on their own, without any external influence, or in combination with an external influence. Example external influences are heat, mechanical means such as pressing, and the addition of a chemical.

In some examples, the jacket 32 incorporates self-healing components in the layer 34. The self-healing components can be micro-sized polymer capsules ("microcapsules") which include a breakable shell with a reactive resin encapsulated in the shell. Example reactive resins are acryl-based, vinyl-based, epoxy-based, olefinic rubber based, fluorinated-rubber based, and polyurethane-based resins. When a crack develops in the layer 34, the microcapsules break and release the encapsulated reactive resin. The released resin reacts with surrounding material of the layer 34, such as by forming cross-links with the surrounding material, to build up new material in the crack and "heal" the layer 34 while mitigating propagation of the crack. In one example, chemicals that react with the released reactive resin may be dispersed directly in layer 34 of jacket 32 or may be incorporated into the surface of the micro-sized polymer capsules. Accordingly, upon breakage of the microcapsules, the chemicals react with the release reactive resin.

The microcapsules are formulated to withstand stresses experienced by the jacket 32 during the operating range of the operation of the elevator, which are typically on the order of several megapascals (MPa). Said another way, the shells of the microcapsules do not rupture under these high stresses seen in the operating range of the elevators. Furthermore, the microcapsules are formulated to withstand the method of making the belt 26, discussed in detail below. The microcapsule shell thickness is related to the stress at which the microcapsules rupture, as is known in the art. In a particular example, the microcapsules rupture at pressures greater than about 10 megapascals (MPa).

Another example self-healing component is an intrinsically self-healing material, meaning the material has a chemical makeup which reacts to stress by self-healing. One such material is Diels-Alder-based polymers, which have a particular chemical makeup that, when stressed, induces a Diels-Alder reaction to re-connect broken bonds from the stress. Another intrinsically self-healing material is supramolecular cluster forming polymers, which have individual units held together via highly directional and reversible non-covalent interactions. Because of the reversible nature of these interactions, the individual units can reconnect after disruption of the interactions due to an external stress. Yet another example of a self-healing material is a shape memory polymer which contains a component that can soften, melt, or become reactive upon exposure to an external stimulus such as temperature.

In some examples, the self-healing component comprises less than about 50% percent by weight of the layer 34. The self-healing component can comprise any combination of the example self-healing components discussed above.

In some examples, the jacket 32 includes an outer coating 36 which serves as a protective layer for the jacket 32. The outer coating 36 can be made of a polymeric material with protective properties. For example, the outer coating 36 can include fluoropolymers, which have fire-retardant properties. The outer coating 36 can include a self-healing component, in addition to or instead of the self-healing component in the layer 34 as discussed above. For example, the outer coating 36 can include the microcapsules discussed above and/or the intrinsically self-healing material discussed above. In another example, the outer coating 36 includes an intrinsically self-healing material, In some examples, the self-healing component comprises less than about 50 percent by weight of the outer coating. The self-healing component can comprise any combination of the example self-healing components discussed above.

In some examples, the coating 36 is selectively applied to portions of the jacket 32 and not to others. For example, the coating 36 can be applied to areas of the jacket most prone to cracking, such as areas of the jacket 32 that are opposite the surface that contacts the smallest diameter sheave in elevator system 20, which is typically the traction sheave.

Figure 3:
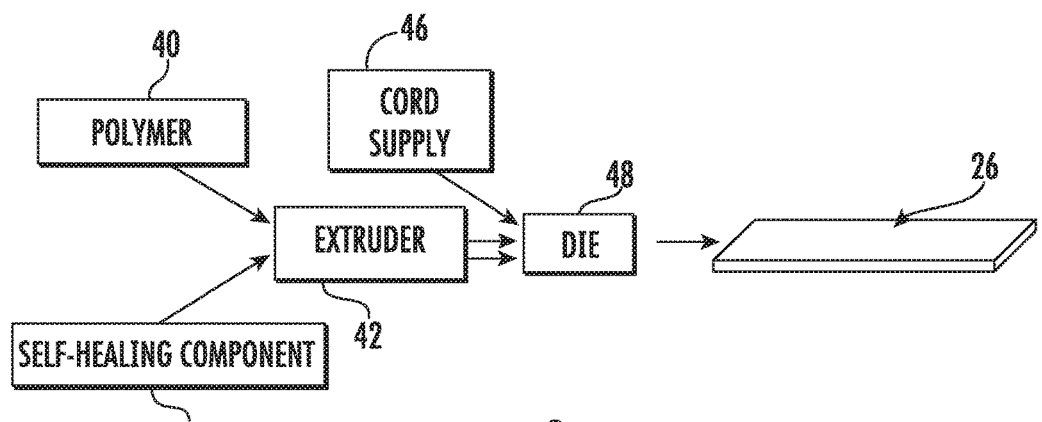
FIG. 3 schematically illustrates an example method of making the example load bearing member.

FIG. 3 schematically illustrates an example method of making the example load bearing member 26. A resin of the material 40 of the outer coating 36 is fed into a coextruder 42 along with a resin of the material 44 of the inner portion 34, which is polyurethane in the illustrated example embodiment. One or both of the materials 40/44 include a self-healing component, as discussed above. The cords 30 are fed from a cord supply 46 into a die 48. The coextruder 42 coextrudes the layer 34 onto the cords 30 in a first or inner section of the die 48 and the outer coating 36 onto the layer 34 in a second or outer section of the die 48. In examples where the layer 34 includes microcapsules, the microcapsules are formulated to withstand stresses exhibited on the microcapsules during the extrusion process.

In some examples, the adhesion properties of the materials used in the coextrusion are sufficient to secure the outer layer 36 to the layer 34 without requiring additional adhesive layers between them. In other examples, an adhesive could be used.

Figure 4:
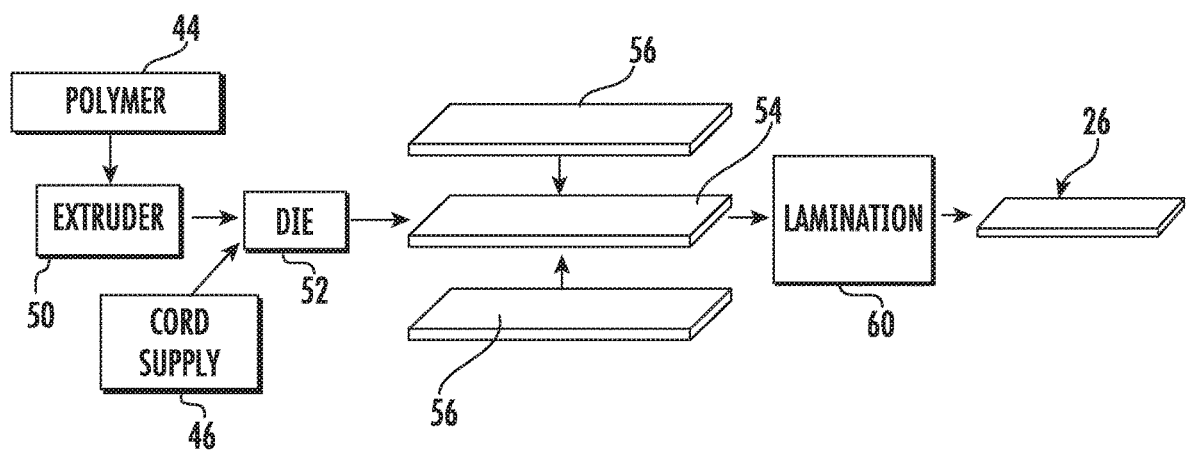
FIG. 4 schematically illustrates another example method of making the example load bearing member.

Another example method is illustrated in FIG. 4. In this embodiment, the resin of the material 44 of the layer 34 is fed into an extruder 50 that extrudes the inner portion 34 onto the cords 30 within a die 52. One or both of the materials 40/44 include a self-healing component, as discussed above. The resulting structure 54 includes cords 30 encased in the layer 34. Preformed layers 56 of the outer coating 36 are situated against the structure 54 and laminated together at 60. The resulting load bearing member 26 includes the outer coating 36 surrounding the inner portion 34 as shown in FIG. 2, for example. In examples where the layer 34 includes microcapsules, the microcapsules are formulated to withstand stresses exhibited on the microcapsules during the extrusion process.

In another example, the outer coating 36 can be applied to the structure 54 by painting, dip coating, or other applications methods as would be known in the art.

A load bearing member designed according to an embodiment of this invention may have a different configuration than the flat belt style of load bearing member 26 in the illustrations and described above. For example, the load bearing member may have a round cross-section.

The load bearing member 26 described herein has the technical benefit and effect of improved useful lifetime and failure resistance due to the inclusion of self-healing components. In particular, the technical benefit and effect is achieved by the self-healing components' mitigation of cracks or other damage should such damage occur to the load bearing member 26, as discussed above.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. An elevator load bearing member, comprising:
a plurality of load bearing cords; and
a jacket at least partially surrounding the cords, the jacket including a layer received against the cords, and a self-healing component, wherein the self-healing component includes microcapsules, the microcapsules including a breakable shell with a reactive resin encapsulated in the shell of polymer resins, and wherein a chemical that is reactive with respect to the reactive resin is incorporated into a surface of the breakable shell.

2. The elevator load bearing member of claim 1, further comprising an outer coating surrounding the jacket, the outer coating including the self-healing component.

3. The elevator load bearing member of claim 2, wherein the layer includes the self-healing component.

4. The elevator load bearing member of claim 2, wherein the outer coating is selectively applied to portions of the layer.

5. The elevator load bearing member of claim 2, wherein the self-healing component includes an intrinsically self-healing material.

6. The elevator load bearing member of claim 2, wherein the outer coating includes less than 50 percent by weight of the self-healing component.

7. The elevator load bearing member of claim 1, wherein the layer includes the self-healing component.

8. The elevator load bearing member of claim 7, further comprising an outer coating surrounding the jacket, the outer coating including the self-healing component.

9. The elevator load bearing member of claim 8, wherein the self-healing component in the outer coating includes at least one of an intrinsically self-healing material and a shape memory polymer.

10. The elevator load bearing member of claim 1, wherein the microcapsules rupture at pressures greater than 10 megapascals (MPa).

11. The elevator load bearing member of claim 1, wherein the layer includes less than 50 percent by weight of the self-healing component.

12. The elevator load bearing member of claim 1, wherein the self-healing component includes a shape memory polymer.

13. The elevator load bearing member of claim 12, wherein the shape memory polymer includes a component that softens, melts, or becomes reactive upon heating.

14. The elevator load bearing member of claim 1, wherein the reactive resin is reactive with respect to the jacket such that reaction of the reactive resin with the jacket forms cross-links between the reactive resin and the jacket.

15. A method of making an elevator load bearing member, the method comprising:
forming a jacket on a plurality of load bearing members, the jacket including a self-healing component, wherein the self-healing component includes microcapsules, the microcapsules including a breakable shell with a reactive resin encapsulated in the shell of polymer resins, and wherein a chemical that is reactive with respect to the reactive resin is incorporated into a surface of the breakable shell.

16. The method of claim 15, wherein the self-healing component includes an intrinsically self-healing material.

17. The method of claim 15, wherein the forming includes forming a layer on the plurality of load bearing cords, and forming an outer coating on the layer.

18. The method of claim 17, wherein the forming the outer coating on the layer includes selectively applying the outer coating to portions of the layer.

19. The method of claim 15, wherein the jacket includes less than 50 percent by weight of the self-healing component.

* * * * *